(12) United States Patent
Unesaki

(10) Patent No.: US 12,007,861 B2
(45) Date of Patent: Jun. 11, 2024

(54) TEST CONTROL DEVICE, TEST SYSTEM, AND CONTROL METHOD FOR DEVICE TESTING WITH PREDICTABLE AND REDUCED TEST TIMES

(71) Applicant: KIOXIA CORPORATION, Tokyo (JP)

(72) Inventor: Tsutomu Unesaki, Tokyo (JP)

(73) Assignee: Kioxia Corporation, Tokyo (JP)

( * ) Notice: Subject to any disclaimer, the term of this patent is extended or adjusted under 35 U.S.C. 154(b) by 61 days.

(21) Appl. No.: 17/685,238

(22) Filed: Mar. 2, 2022

(65) Prior Publication Data

US 2023/0080117 A1    Mar. 16, 2023

(30) Foreign Application Priority Data

Sep. 16, 2021  (JP) .................................. 2021-151364

(51) Int. Cl.
G06F 11/27    (2006.01)
G06F 11/22    (2006.01)

(52) U.S. Cl.
CPC .......... *G06F 11/27* (2013.01); *G06F 11/2257* (2013.01)

(58) Field of Classification Search
None
See application file for complete search history.

(56) References Cited

U.S. PATENT DOCUMENTS

| 6,564,162 B1 * | 5/2003 | Erskine | G06F 11/277 702/123 |
| 2003/0076723 A1 * | 4/2003 | Zarrineh | G11C 29/56004 365/201 |
| 2005/0193274 A1 * | 9/2005 | Aoki | G11C 29/56 714/42 |
| 2009/0271662 A1 * | 10/2009 | Tarta | G06F 11/3672 714/37 |

(Continued)

FOREIGN PATENT DOCUMENTS

| JP | 2020102082 A | 7/2020 |
| JP | 2020144826 A | 9/2020 |
| JP | 2020194535 A | 12/2020 |

OTHER PUBLICATIONS

Brandon Greenwell et al., "vip: Variable Importance Plots", https://koalaverse.github.io/vip/index.html, 2 pages.

(Continued)

*Primary Examiner* — Joseph O Schell
(74) *Attorney, Agent, or Firm* — Kim & Stewart LLP

(57) ABSTRACT

A test control device includes a test variable generation device and a test processing device. The test variable generation device uses a test prediction model to generate a first manipulated variable based on a difference between a target value and a first controlled variable value from a device under test. The test processing device acquires a second controlled variable value from the device under based on use of the first manipulated variable value. The test variable generation device notifies the device under test of end of a (Continued)

test if the second controlled variable value is equal to or greater than the target value or uses the test prediction model to generate a second manipulated variable based on a difference between the target value and the second controlled variable value when the second controlled variable value is less than the target value.

20 Claims, 8 Drawing Sheets

(56) References Cited

U.S. PATENT DOCUMENTS

| | | | | |
|---|---|---|---|---|
| 2012/0161800 | A1* | 6/2012 | Ishida | G01R 31/31932 |
| | | | | 324/750.01 |
| 2014/0067738 | A1* | 3/2014 | Kingsbury | G06N 3/08 |
| | | | | 706/20 |
| 2017/0108551 | A1* | 4/2017 | Aliyev | G01R 31/3865 |
| 2018/0107410 | A1* | 4/2018 | Barajas Gonzalez | |
| | | | | G06F 3/0629 |
| 2020/0265328 | A1* | 8/2020 | Kaditz | G06N 3/084 |
| 2020/0409450 | A1* | 12/2020 | Hovis | G06F 1/3296 |
| 2022/0198340 | A1* | 6/2022 | Gao | G06N 7/01 |
| 2022/0292239 | A1* | 9/2022 | Kahraman | G06N 20/00 |

OTHER PUBLICATIONS

David A. Harville, "Matrix Algebra From a Statistician's Perspective", Springer Science + Business Media, LLC, New York, USA, 1997, pp. 79-105, http://www.ru.ac/bd/wp-content/uploads/sites/25/2019/03/106_04_Harville_Matrix_Algebra_From_a_Statistic.pdf.

* cited by examiner

FIG. 2

```
1  input z', y', x_min, x_max
2  x' = {}
3  for i from 1 to NUMBER OF VARIABLES INCLUDED
   IN MANIPULATED VARIABLE x'
4  x'[i] = UNIFORM RANDOM NUMBER(x_min, x_max)
5  output x'
```

FIG. 3

MANIPULATED VARIABLE x

| COMMAND | NUMBER OF COMMANDS |
|---|---|
| READ | 3 |
| WRITE | 2 |
| RESET | 1 |

(1) GENERATE COMMAND LIST

71

| COMMAND |
|---|
| READ |
| READ |
| READ |
| WRITE |
| WRITE |
| RESET |

(2) SHUFFLE COMMANDS

71

| COMMAND |
|---|
| WRITE |
| READ |
| RESET |
| WRITE |
| READ |
| READ |

(3) GENERATE ADDRESS, TRANSFER SIZE, AND WRITE DATA

72

| COMMAND | ADDRESS | TRANSFER SIZE | DATA |
|---|---|---|---|
| WRITE | X | 1 | 0xAB |
| READ | Y | 2 | ? |
| RESET | ... | ... | ... |
| WRITE | Z | 2 | 0xBC,0xCD |
| READ | X | 2 | ? |
| READ | Z | 1 | ? |

(4) EMBED EXPECTED VALUE

72

| COMMAND | ADDRESS | TRANSFER SIZE | DATA |
|---|---|---|---|
| WRITE | X | 1 | 0xAB |
| READ | Y | 2 | 0xXX |
| RESET | ... | ... | ... |
| WRITE | Z | 2 | 0xBC,0xCD |
| READ | X | 2 | 0xAB,0xXX |
| READ | Z | 1 | 0xBC |

(5) OUTPUT TEST VECTOR

FIG. 6

```
1  input z, y, w
2  OBTAIN GENERAL INVERSE MATRIX OF w⁻ = w
3  x = w⁻(z-y)
4  output x
```

TEST CONTROL DEVICE, TEST SYSTEM, AND CONTROL METHOD FOR DEVICE TESTING WITH PREDICTABLE AND REDUCED TEST TIMES

CROSS-REFERENCE TO RELATED APPLICATION

This application is based upon and claims the benefit of priority from Japanese Patent Application No. 2021-151364, filed Sep. 16, 2021, the entire contents of which are incorporated herein by reference.

FIELD

Embodiments described herein relate generally to a test control device, a test system, and a control method for testing a device.

BACKGROUND

Tests may be performed on a device to verify that the device satisfies certain specifications. In the testing, the device performs processing based on the a given manipulated variable (which may include a plurality of individual values). For example, a random number is used as the manipulated variable supplied to the device. The device outputs a controlled variable value (or values) based on the result of the executed processing using the supplied manipulated variable.

A target value for the controlled variable value is set based on the device specifications. The testing on the device is repeated until the controlled variable value reaches the target value. However, when a random number is used as a basis for a manipulated variable, the time (test time) until the controlled variable reaches the target value is not predictable. In some case, the test time may be overly long.

BRIEF DESCRIPTION OF THE DRAWINGS

FIG. 2 is a diagram showing an example of a processing sequence of a test manipulated variable generation device provided in a test execution log output device in a test system according to a first embodiment.

FIG. 3 is a diagram showing an example of data obtained in a process of generating a test vector by using a manipulated variable in a test vector generation device in a test processing device.

FIG. 6 is a diagram showing an example of a processing sequence of a manipulated variable generation device provided in a test control device in a test system according to a first embodiment.

DETAILED DESCRIPTION

Embodiments provide a test control device, a test system, and a control method in which a test time can be predictable and shortened.

In general, according to one embodiment, a test control device includes a test manipulated variable generation device and a test processing device. The test manipulated variable generation device is configured to predict a value for a controlled variable for a device under test based on a test prediction model to generate a first manipulated variable that is based on a difference between a target value and a first controlled variable value from the device under test. The device under test executes processing based on a manipulated variable supplied for this purpose. The manipulated variable may include one or more individual variables and the device under test generates controlled variable values based on the supplied manipulated variable. The test processing device is configured to acquire a second controlled variable value from the device under test based on the generated first manipulated variable. The test manipulated variable generation device is further configured to notify the device under test of an end of a test if the second controlled variable value is equal to or greater than the target value, and use the test prediction model to generate a second manipulated variable based on a difference between the target value and the second controlled variable value if the second controlled variable value is less than the target value.

First Embodiment

Figure 1A:
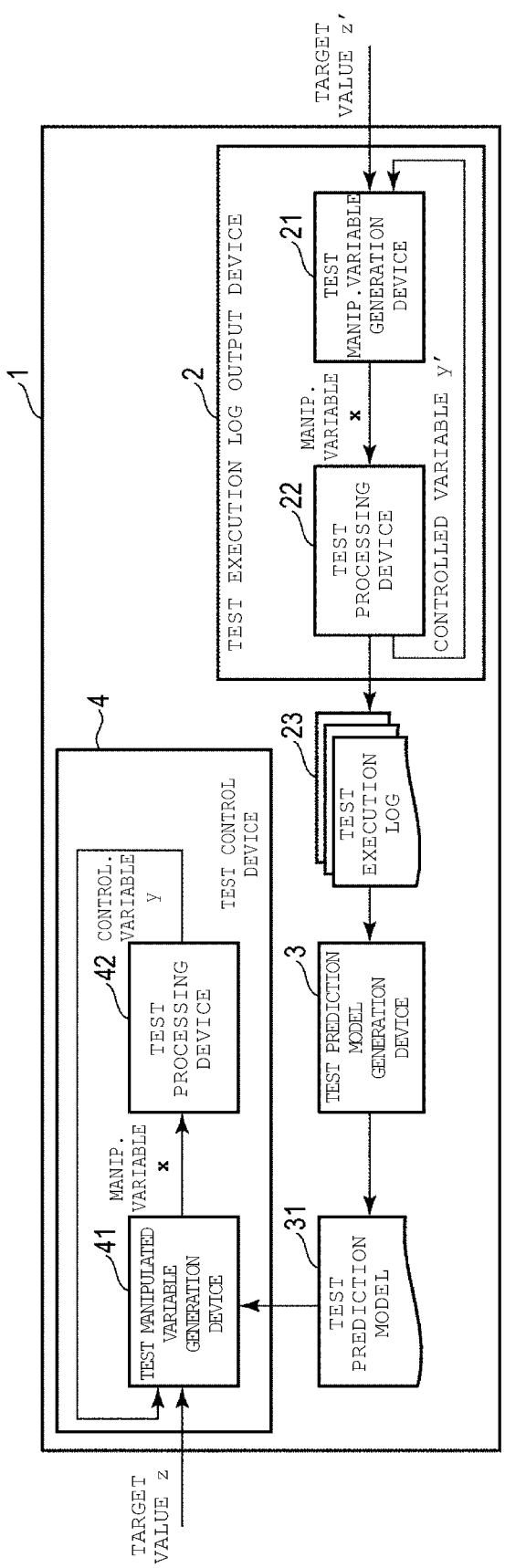
FIG. 1A is a diagram showing an operation example in a test system according to a first embodiment.

FIG. 1A is a diagram showing an operation example in a test system 1 according to a first embodiment. The test system 1 tests a device in order to verify whether the device satisfies certain specifications.

The test system 1 includes a test execution log output device 2, a test prediction model generation device 3, and a test control device 4.

The test execution log output device 2 is a device that outputs a test execution log 23. The test execution log 23 is log data related to a test executed by the test execution log output device 2. The test execution log 23 includes, for example, information indicating the content of the test, numerical values calculated during the test, and information that is based on the test result (for example, a message).

The test prediction model generation device 3 is a device that generates a test prediction model 31 by using the test execution log 23. The test prediction model 31 is a prediction model that predicts the value of the controlled variable when the processing based on a manipulated variable value is executed. In the test system 1 according to the first embodiment, it is assumed that the test prediction model 31 is a linear regression model. The matrix of coefficients representing the linear regression model is the matrix from which an inverse matrix may be obtained.

The test control device 4 is a device that controls the testing by using the test prediction model 31.

Test Execution Log Output Device

The test execution log output device 2 includes a test manipulated variable generation device 21 and a test processing device 22.

The test manipulated variable generation device 21 is a device that generates a value for manipulated variable x'. The manipulated variable x' value is an input to the test processing device 22.

The test processing device 22 is a device that executes a test using the generated value for the manipulated variable x' and outputs a controlled variable y' value and the test execution log 23.

The value of the controlled variable y' is the value of the variable value obtained from the executed test using the particular manipulated variable x' value. The controlled variable y' indicates such things as the number of commands, time, values, cumulative amounts, and the like related to a specific operation in the testing.

The test execution log 23 is log data related to the executed test. The test execution log 23 includes information indicating the content of the test (e.g., test type, test parameters), numerical values calculated during the test, information based on the test result (for example, a message indicating a testing outcome), and the like. The test execution log 23 also includes the manipulated variable x' value(s) and the corresponding controlled variable y' value(s).

Test Control Device

The test control device 4 includes a test manipulated variable generation device 41 and a test processing device 42.

The test manipulated variable generation device 41 is a device that generates or selects a manipulated variable x by using the test prediction model 31. The manipulated variable x is an input to the test processing device 42.

The test processing device 42 is a device that executes a test using the manipulated variable x and outputs a value of a controlled variable y and a test execution log.

The value of the controlled variable y is the value of the variable obtained from the executed test. The controlled variable y indicates such things as the number of commands, times, values, cumulative amounts, and the like related to specific operations in the test.

The test execution log is log data related to the executed test. The test execution log contains information indicating the content of the test, numerical values calculated during the test, information based on the test result (for example, a message), and the like. The test execution log includes the manipulated variable x and the controlled variable y.

Figure 1B:
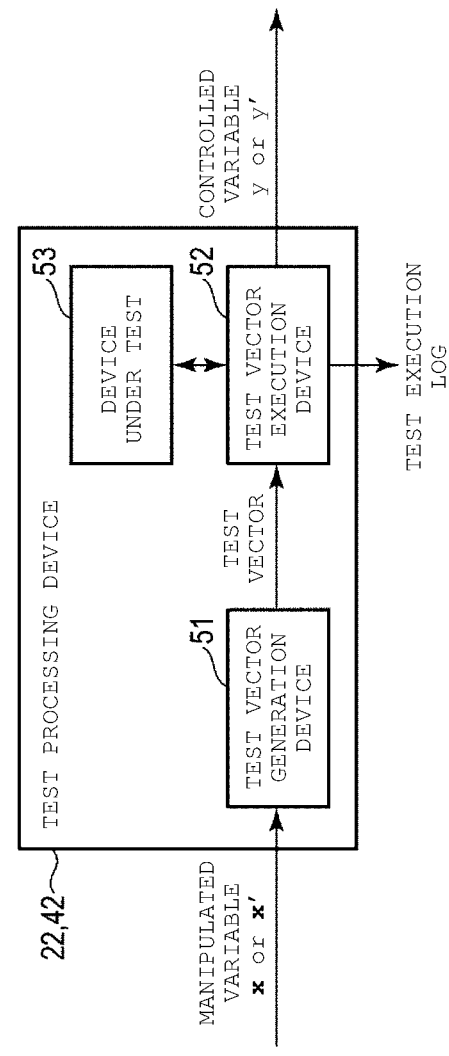
FIG. 1B is a diagram showing an operation example in a test processing device in a test system according to the first embodiment.

FIG. 1B is a diagram showing an operation example of the test processing devices 22 and 42 in the test system 1 according to the first embodiment.

The test processing devices 22 and 42 each include a test vector generation device 51, a test vector execution device 52, and a device under test (DUT) 53.

The test vector generation device 51 is a device that generates a test vector based on the input manipulated variable x or x'. The test vector is data input to the DUT 53. The test vector includes, for example, commands and operation parameters.

The test vector execution device 52 is a device that causes the DUT 53 to execute processing based on a test vector. The test vector execution device 52 outputs the controlled variable y or y' and a test execution log.

The device under test 53 (DUT 53) is a device being tested for determining whether or not a device specification is satisfied by the DUT 53. The DUT 53 is, for example, a storage device. In some examples, DUT 53 is a solid-state drive (SSD) or a universal flash storage (UFS) device. In general, the DUT 53 is separable from the test processing devices 22 and 42 such that a plurality of DUTs 53 may be tested over time. Similarly, though a single DUT 53 is depicted in FIG. 1B, a plurality of DUTs 53 may be placed in (or attached to) the test processing devices 22 and 42 at the same time.

The operations of the test execution log output device 2, the test prediction model generation device 3, and the test control device 4 will be described.

A target value z' is given to the test execution log output device 2. The test execution log output device 2 repeatedly outputs a test execution log until the controlled variable y' reaches the target value z'.

The target value z' is set as a condition for ending the output of the test execution log 23. For the target value z', a target value of the controlled variable y' that can predict (or correlates to) a test time is set in the test execution log output device 2.

The test time tracked in the test execution log output device 2 is the time from the start of testing in the test execution log output device 2 until the controlled variable y' becomes equal to or greater than the target value z'. A controlled variable y' that correlates to the test time is, for example, the running time of a test operation or the number of repetitions of a test operation in the test.

In the test execution log output device 2, the test manipulated variable generation device 21 generates a value for the manipulated variable x' by using or selecting, for example, a random number. A specific method for generating the manipulated variable x' will be described later with reference to FIG. 2. The test manipulated variable generation device 21 outputs the generated manipulated variable x' to the test processing device 22.

The test processing device 22 tests the DUT 53 by using the received manipulated variable x' value. That is, the test processing device 22 causes the DUT 53 to execute processing based on the manipulated variable x'. Then, the test processing device 22 outputs the controlled variable y' resulting from the processing executed by the DUT 53 and the test execution log 23.

More specifically, in the test processing device 22, the test vector generation device 51 converts the manipulated variable x' to a test vector used for executing the processing in the DUT 53. The test vector generation device 51 sends the generated test vector to the test vector execution device 52.

The test vector execution device 52 sends commands and parameters that are part of the test vector to the DUT 53 in a form and at a timing which the DUT 53 may execute appropriate processing. Thus, the test vector execution device 52 can cause the DUT 53 to execute processing based on the test vector. Then, based on the processing executed by the DUT 53, the test vector execution device 52 sends the controlled variable y' to the test manipulated variable generation device 21. The test vector execution device 52 then generates the test execution log 23 based on the processing executed by the DUT 53.

In the test execution log output device 2, the test manipulated variable generation device 21 generates values for the manipulated variable x'. The test processing device 22 operates to repeatedly execute a test operation based on the manipulated variable x' until the controlled variable y' reaches the target value z'. That is, the test execution log output device 2 outputs the test execution log 23 to the test prediction model generation device 3 until the controlled variable y' reaches the target value z'.

Next, a specific method for generating the manipulated variable x' in the test manipulated variable generation device 21 will be described.

FIG. 2 is a diagram showing an example of a processing sequence of the test manipulated variable generation device 21 provided in the test execution log output device 2 in the test system 1 according to the first embodiment. In FIG. 2, the processing sequence of the test manipulated variable generation device 21 is represented as a pseudo program.

The target value z', the controlled variable y', a lower limit value $x_{min}$ for the manipulated variable x', and an upper limit value $x_{max}$ for the manipulated variable x' are input to the test manipulated variable generation device 21 (first line in FIG. 2). The controlled variable y' is an initial value or a controlled variable obtained from a previous processing result by the DUT 53. The lower limit value $x_{min}$ is the lower limit value that may be generated as the manipulated variable x'. The upper limit value $x_{max}$ is the upper limit value that may be generated as the manipulated variable x'.

The test manipulated variable generation device 21 defines the manipulated variable x' as a one-dimensional array (second line in FIG. 2). That is, the manipulated variable x' is composed of a total of r variables (or variates), where r is an integer of 1 or more.

The test manipulated variable generation device 21 generates random numbers as the values of the individual r variables constituting the manipulated variable x' (third and fourth lines in FIG. 2). The random number is a random number based on the constraints of the lower limit value $x_{min}$ and the upper limit value $x_{max}$. The random number is, for example, a uniform random number.

More specifically, the test manipulated variable generation device 21 performs repetitive processing in which a variable i is incremented by 1 from 1 to r. In each i-th repetitive processing, the test manipulated variable generation device 21 generates a uniform random number. Then, the test manipulated variable generation device 21 sets the generated uniform random number as a variable x'[i] for each of the r variables included in the manipulated variable x'.

After generating random numbers for each of the variables (total of r variables) constituting the manipulated variable x', the test manipulated variable generation device 21 outputs the manipulated variable x' to the test processing device 22 (fifth line in FIG. 2).

By the processing sequence of FIG. 2, the test manipulated variable generation device 21 can generate the manipulated variable x'. The test manipulated variable generation device 21 repeatedly generates the manipulated variable x' according to the processing sequence shown in FIG. 2 until the testing is ended. That is, the test manipulated variable generation device 21 repeatedly generates values for the manipulated variable x' until the controlled variable y' output by the test processing device 22 becomes equal to or greater than the target value z'.

Next, an operation in which the test vector generation device 51 generates a test vector by using either one of the manipulated variable x or the manipulated variable x' will be described.

FIG. 3 is a diagram showing an example of data obtained in the process of generating a test vector from a manipulated variable x in the test vector generation device 51. The manipulated variable x is input to the test vector generation device 51 in the test processing device 22. The manipulated variable x shown in FIG. 3 may be replaced with the manipulated variable x' and substantially the same processing occurs.

In the example shown in FIG. 3, it is assumed that the DUT 53 is a storage device. The manipulated variable x indicates one or more types of commands that can be executed by the DUT 53 and the number for each of the types of commands to be repeatedly executed. That is, the manipulated variable x includes one or more individual variables that indicate the number of times each of the types of commands are to be executed.

In the example shown in FIG. 3, the manipulated variable x indicates three types of commands and the number of times for each of the three types of commands to be executed. That is, in this example, the manipulated variable x includes three different variables indicating the number of times each of the three types of commands is to be executed. The three types of commands are a read command, a write command, and a reset command. The number of read commands to be executed is 3. The number of write commands to be executed is 2. The number of reset commands to be executed is 1.

The test vector generation device 51 generates a command list 71 based on the manipulated variable x ((1) in FIG. 3). The command list 71 includes three read commands, two write commands, and one reset command.

The test vector generation device 51 shuffles the commands included in the command list 71 ((2) in FIG. 3). The test vector generation device 51 uses, for example, random numbers to determine the order of each command in the shuffling of the commands.

The test vector generation device 51 generates necessary parameters for each shuffled command ((3) in FIG. 3). The test vector generation device 51 uses, for example, a random number to generate (set) these parameters. The parameters to be generated for a read command are, for example, the address for which read is requested and the size of the read data to be transferred (transfer size). The parameters to be generated for the write command are, for example, the address for which write is requested, the size of the write data to be transferred (transfer size), and the write data (data to be written). For the reset command, for example, no parameters are required to be generated.

FIG. 3 shows a command parameter table 72 including an address field, a transfer size field, and a data field in addition to a command field corresponding to the command list 71. The address field indicates the address generated for the corresponding command. The transfer size field indicates the transfer size generated for the corresponding command. The data field indicates the data generated for the corresponding command.

In the command parameter table 72, an address "X", a transfer size "1", and write data "0xAB" are generated for a first write command from the top. An address "Y" and a transfer size "2" are generated for a second read command from the top.

The test vector generation device 51 also generates an expected value of read data as a parameter generated for the read command ((4) in FIG. 3). The expected value of the read data is the data to be read from the DUT 53 (storage device) based on the corresponding read command. In the command parameter table 72, an expected value "0xXX" of the read data is generated for the second read command from the top in this example. The generated expected value "0xXX" of the read data is embedded in the corresponding data field.

Then, the test vector generation device 51 outputs a test vector to the test vector execution device 52 by using the command parameter table 72. The test vector is data indicating one or more commands and parameters generated for each of the commands. In the example shown in FIG. 3, the test vector is data showing six commands and specific parameters generated for each of the six commands. The test vector is, for example, text data. The test vector may be binary data in other examples.

Next, the test execution log acquisition processing executed by the test execution log output device 2 will be described.

Figure 4:
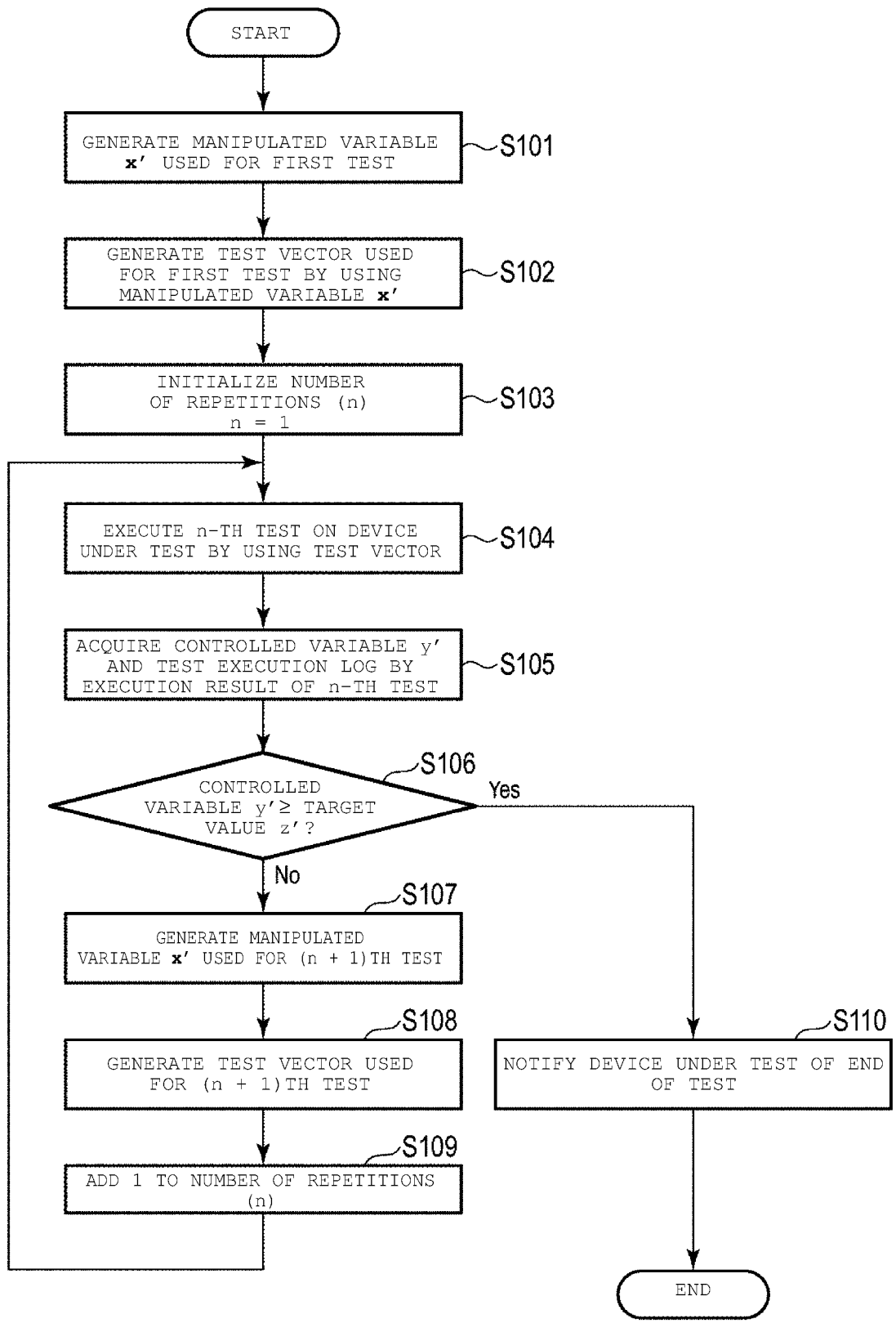
FIG. 4 is a flowchart of test execution log acquisition processing executed in a test execution log output device in a test system according to a first embodiment.

FIG. 4 is a flowchart showing an example of a procedure of test execution log acquisition processing executed by the test execution log output device 2 in the test system 1 according to the first embodiment. The test execution log acquisition processing is processing for acquiring the test execution log 23 until the controlled variable y' reaches the target value z'. The test execution log output device 2 starts the test execution log acquisition processing when, for example, the test execution log output device 2 is requested to output the test execution log 23. The target value z' is input to the test execution log output device 2.

In the test execution log output device 2, the test manipulated variable generation device 21 generates the manipulated variable x' used for a first test (S101). The test manipulated variable generation device 21 sends the generated manipulated variable x' to the test vector generation device 51 in the test processing device 22.

The test vector generation device 51 uses the manipulated variable x' to generate a test vector to be used for the first test (S102). The test vector generation device 51 sends the generated test vector to the test vector execution device 52 in the test processing device 22.

The test vector execution device 52 initializes a variable n used in the test execution log output device 2 (S103). The value of the variable n indicates the number of times the test has been performed on the DUT 53 in the test execution log acquisition processing. The test vector execution device 52 sets, for example, the variable n to 1. That is, the test vector execution device 52 initializes the variable n to an initial value. The variable n corresponds to the number of test repetitions.

The test vector execution device 52 executes an n-th test on the DUT 53 by using the generated test vector (S104). Then, the test vector execution device 52 acquires the controlled variable y' and the test execution log 23 by using the execution result of the n-th test (S105). The controlled variable y' is, for example, the execution time of the test execution log acquisition processing or the number of times the test has been performed in the test execution log acquisition processing. The test execution log 23 includes the manipulated variable x' and the controlled variable y'.

Next, the test manipulated variable generation device 21 determines whether or not the acquired controlled variable y' is equal to or greater than the target value z' (S106). For example, when the number of repetitions (n) is used as the controlled variable y', the test manipulated variable generation device 21 determines whether or not the number of repetitions (n) is equal to or greater than the target value z'. In this case, the target value z' is a threshold value or maximum value for the number of repetitions (for example, 100 times).

When the controlled variable y' is less than the target value z' (S106 No), the test manipulated variable generation device 21 generates the manipulated variable x' used for the (n+1)th test (S107). The test manipulated variable generation device 21 sends the generated manipulated variable x' to the test vector generation device 51.

The test vector generation device 51 uses the manipulated variable x' to generate a test vector to be used for the (n+1)th test (S108). The test vector generation device 51 sends the generated test vector to the test vector execution device 52.

The test vector execution device 52 adds 1 to the present number of repetitions (n) (S109), and returns to the procedure of S104. By returning/looping to the procedure of S104, the test vector execution device 52 repeatedly executes the test on the DUT 53, and acquires the controlled variable y' and the test execution log 23. In this way, the procedures S107 to S109 are repeated so long as the controlled variable y' is less than the target value z'.

When the controlled variable y' is equal to or greater than the target value z' (S106 Yes), the test manipulated variable generation device 21 notifies the DUT 53 of the end of the test (S110), and ends the test execution log acquisition processing (end).

By the test execution log acquisition processing shown in FIG. 4, the test execution log output device 2 may acquire the test execution log 23. The test execution log output device 2 outputs the acquired test execution log 23 to the test prediction model generation device 3.

Test Prediction Model Generation Device

The test prediction model generation device 3 uses the test execution log 23 to perform linear regression analysis, for example, in which an explanatory variable is the manipulated variable x and an objective variable is the controlled variable y. The objective variable is the variable that a tester wants to predict. The explanatory variable is a variable that explains the objective variable. The test prediction model generation device 3 acquires a linear regression model f generated by the linear regression analysis as the test prediction model 31.

Equation 1

The test prediction model 31 (that is, prediction value $\hat{y}$ of the controlled variable y) is represented by the following equation.

$$\hat{y} = f(x) = w^T x$$

$$w = (w_0, w_1, \ldots, w_r)^T$$

$$x = (x_0, x_1, \ldots, w_r)^T$$

r: the number of individual variables included in the manipulated variable x w indicates the coefficient matrix of the linear regression model. T represents transposition. r indicates the number of variables included in the manipulated variable x.

In the following, the notation symbol "^" (hat) indicating a prediction value may also be placed immediately before a character instead of directly above the character. For example, the prediction value of the controlled variable y is expressed as "^y".

The test prediction model generation device 3 sends the acquired test prediction model 31 to the test control device 4. More specifically, the test prediction model generation device 3 sends, for example, a coefficient matrix w of the test prediction model 31 to the test control device 4.

Test Control Device

The test control device 4 is given a target value z. In the test control device 4, the test is repeated until the controlled variable y reaches the target value z.

The target value z is a condition for ending the test. The target value z is determined, for example, based on the specifications of the DUT 53. In the following, a case where the target value z is larger than 0 will be illustrated. The target value z may be a value of 0 or less.

The controlled variable y is the value of a variable obtained based on the executed test. The controlled variable y indicates the number of commands, time, amount, and the like related to a specific operation in the test. More specifically, the controlled variable y is, for example, the execution time, the number of repetitions, the number of executed commands, the number of retries or errors, the number of events generated inside the DUT 53, or normal end (pass) or abnormal end (fail) of an executed command. Events that occur inside the DUT 53 are, for example, garbage collection (that is, compaction), active wear leveling, erase operation for blocks, and interruption of power supply to the DUT 53 (that is, power failure).

In the following, a case where the target value z and the controlled variable y each include one variable (or variate) is shown. The target value z and the controlled variable y may each include a plurality of variables. When each of the target value z and the controlled variable y includes a plurality of variables, for example, the operation related to the target value z and the controlled variable y described below may be performed for each variable.

In the test control device 4, the test manipulated variable generation device 41 generates the manipulated variable x, and the test processing device 42 repeatedly causes the DUT 53 to execute the processing based on the manipulated variable x until the controlled variable y reaches the target value z. That is, the test control device 4 repeatedly tests the DUT 53 until the controlled variable y reaches the target value z.

More specifically, the test manipulated variable generation device 41 generates the manipulated variable x estimated based on the difference between the target value z and the controlled variable y by using the test prediction model 31. A specific method for generating the manipulated variable x will be described later with reference to FIG. 6. The test manipulated variable generation device 41 outputs the generated manipulated variable x to the test processing device 42.

The test processing device 42 performs a test on the DUT 53 by using the manipulated variable x. More specifically, the test processing device 42 causes the DUT 53 to execute processing based on the manipulated variable x. Then, the test processing device 42 outputs the controlled variable y and the test execution log based on the result of the processing executed by the DUT 53.

More specifically, in the test processing device 42, the test vector generation device 51 converts the manipulated variable x to a test vector used for executing the processing by the DUT 53. The test vector generation device 51 sends the generated test vector to the test vector execution device 52.

The test vector execution device 52 sends commands and parameters included in the test vector to the DUT 53 in a form and at a timing when the DUT 53 can execute processing. As a result, the test vector execution device 52 can cause the DUT 53 to execute the processing based on the test vector. The test vector execution device 52 sends the controlled variable y to the test manipulated variable generation device 41 based on the processing executed by the DUT 53. Further, the test vector execution device 52 generates a test execution log based on the processing executed by the DUT 53.

Figure 5:
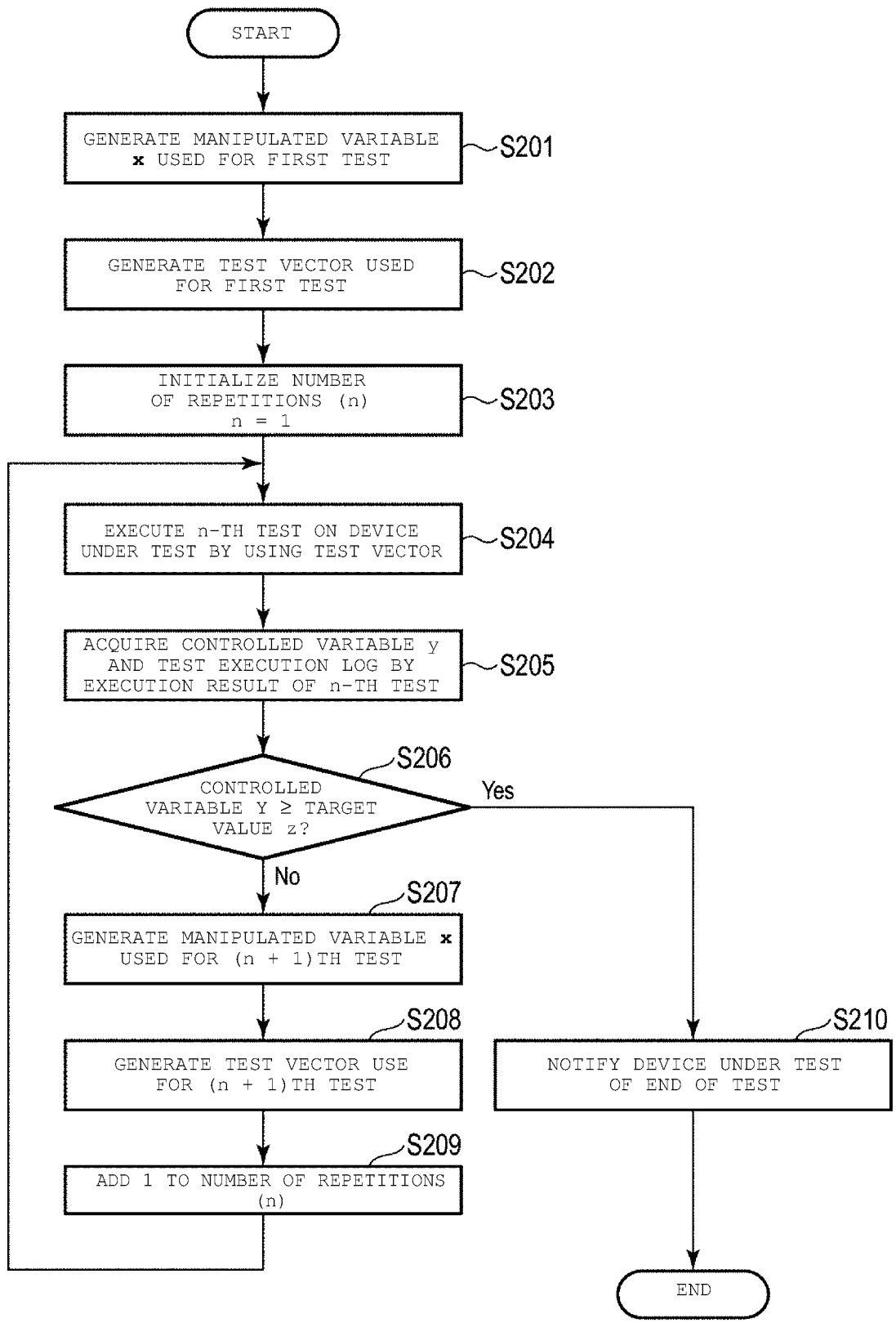
FIG. 5 is a flowchart of test control processing executed in a test control device in a test system according to a first embodiment.

FIG. 5 is a flowchart showing an example of a procedure of test control processing executed in the test control device 4 in the test system 1 according to the first embodiment. The test control processing is processing for performing a test on the DUT 53 until the controlled variable y reaches the target value z. The test control device 4 starts the test control processing, for example, when the test control device 4 is requested to perform a test on the DUT 53. The target value z is input to the test control device 4.

In the test control device 4, the test manipulated variable generation device 41 generates the manipulated variable x used for the first test (S201). The test manipulated variable generation device 41 sends the generated manipulated variable x to the test vector generation device 51 in the test processing device 42.

The test vector generation device 51 uses the manipulated variable x to generate a test vector used for the first test (S202). The test vector generation device 51 sends the generated test vector to the test vector execution device 52 in the test processing device 42.

The test vector execution device 52 initializes the variable n used in the test control device 4 (S203). The variable n indicates the number of times the test has been performed on the DUT 53 in the test control processing during execution. The test vector execution device 52 sets the variable n to 1, for example, in order to initialize the variable n.

The test vector execution device 52 executes the n-th test on the DUT 53 by using the generated test vector (S204). Then, the test vector execution device 52 acquires the controlled variable y and the test execution log by using the execution result of the n-th test (S205).

Next, the test manipulated variable generation device 41 determines whether or not the acquired controlled variable y is equal to or greater than the target value z (S207).

When the controlled variable y is less than the target value z (S206 No), the test manipulated variable generation device 41 generates the manipulated variable x to be used for the (n+1)th test (S207). The test manipulated variable generation device 41 outputs the generated manipulated variable x to the test vector generation device 51.

The test vector generation device 51 uses the manipulated variable x to generate a test vector to be used for the (n+1)th test (S208). The test vector generation device 51 outputs the generated test vector to the test vector execution device 52.

The test vector execution device 52 adds 1 to the number of repetitions (n) (S209), and returns to the procedure of S204. By returning to the procedure of S204, the test vector execution device 52 executes another test (the n-th test) on the DUT 53, and acquires the controlled variable y and the test execution log. In this way, the procedures S207 to S209 are repeated while the controlled variable y is still less than the target value z.

When the controlled variable y is equal to or greater than the target value z (S206 Yes), the test manipulated variable generation device 41 notifies the DUT 53 of the end of the test (S210), and ends the test control processing (end).

By the test control processing shown in FIG. 5, the test control device 4 can perform a test on the DUT 53 until the controlled variable y reaches the target value z.

Here, a specific method for generating the manipulated variable x in the test manipulated variable generation device 41 will be described.

First, the test manipulated variable generation device 41 calculates an inverse matrix $w^-$ of the coefficient matrix w of the test prediction model 31. To calculate the inverse matrix $w^-$, a generalized inverse matrix of Moore Penrose type is used. The Moore-Penrose inverse matrix of a matrix A is indicated as $A^+$ and satisfies the following four conditions (1) to (4) for the matrix A.

(1) $AA^+A=A$
(2) $A^+AA^+=A^+$
(3) $(A^+A)^T=A^+A$
(4) $(AA^+)^T=AA^+$

For details of Moore-Penrose inverse matrices, refer to Reference Document 1: David A. Harville, "Matrix Algebra From a Statistician's Perspective", Springer-Verlag, 1997.

The test manipulated variable generation device 41 generates the manipulated variable x by using the obtained inverse matrix w⁻.

FIG. 6 is a diagram showing an example of a processing sequence of the test manipulated variable generation device 41 provided in the test control device 4 in the test system 1 according to the first embodiment.

The target value z, the controlled variable y, and the coefficient matrix w of the test prediction model 31 are input to the test manipulated variable generation device 41 (first line in FIG. 6). The controlled variable y is an initial value or a controlled variable obtained from the previous processing result by the DUT 53.

The test manipulated variable generation device 41 obtains the inverse matrix w⁻ of the coefficient matrix w of the test prediction model 31 with the general inverse matrix of Moore Penrose (second line in FIG. 6).

The test manipulated variable generation device 41 calculates the manipulated variable x by using the inverse matrix w⁻ and the difference obtained by subtracting the controlled variable y from the target value z (third line in FIG. 6). The manipulated variable x is the product of the inverse matrix w⁻ and the difference obtained by subtracting the controlled variable y from the target value z. That is, the test manipulated variable generation device 41 can obtain an estimated value of the manipulated variable x with respect to the difference between the target value z and the controlled variable y by the inverse matrix w⁻.

Then, the test manipulated variable generation device 41 outputs the calculated manipulated variable x to the test processing device 42 (fourth line in FIG. 6).

By the processing sequence of FIG. 6, the test manipulated variable generation device 41 can generate the manipulated variable x. The test manipulated variable generation device 41 repeatedly generates the manipulated variable x according to the processing sequence shown in FIG. 6 until the test repeatedly performed on the DUT 53 ends. That is, the test manipulated variable generation device 41 repeatedly generates the manipulated variable x until the controlled variable y obtained from the processing result by the DUT 53 becomes the target value z or more.

The test manipulated variable generation device 41 generates the manipulated variable x based on the test prediction model 31. The test prediction model 31 is a prediction model that predicts the controlled variable y in the DUT 53 that is executed the processing based on the manipulated variable x. Therefore, for example, as compared with the case where a random number is generated as the manipulated variable x, the test manipulated variable generation device 41 can generate the manipulated variable x which is likely to obtain the controlled variable y closer to the target value z.

As a result, the test time can be predicted in the test system 1 (more specifically, the test control device 4) of the first embodiment. The test time is the time from when the test control device 4 starts the processing for testing the DUT 53 until the controlled variable y reaches the target value z. Further, in the test control device 4, the test time can be shortened as compared with the case where a random number is generated as the manipulated variable x, for example.

The test control device 4 may be provided with a device in which the test prediction model generation device 3 and the test manipulated variable generation device 41 are integrated.

Second Embodiment

In the first embodiment, the test prediction model 31 is a linear regression model. For the coefficient matrix w of the linear regression model, the general inverse matrix w⁻ is obtained. Therefore, in the test system 1 according to the first embodiment, the manipulated variable x can be estimated by using the general inverse matrix w⁻.

On the other hand, in the second embodiment, it is assumed that the test prediction model 31 is not only a linear regression model but also a regression model that may not be represented by a matrix equation. Therefore, in the test system 1 according to the second embodiment, the manipulated variable x is estimated without using the general inverse matrix.

The configuration of the test system 1 of the second embodiment is the same as that of the test system 1 of the first embodiment. However, the operation of the test prediction model generation device 3 and the operation of the test manipulated variable generation device 41 in the test control device 4 are different between the second embodiment and the first embodiment. Hereinafter, the points different from the first embodiment will be mainly described.

Test Prediction Model Generation Device

The test prediction model generation device 3 uses the test execution log 23 to perform regression analysis in which the explanatory variable is the manipulated variable x and the objective variable is the controlled variable y. The test prediction model generation device 3 acquires a regression model f generated by the regression analysis as the test prediction model 31. There are no restrictions on the regression model acquired as the test prediction model 31. The test prediction model 31 is, for example, a linear regression model or a non-linear regression model. The non-linear regression model is, for example, a decision tree model.

Equation 2

The test prediction model 31 (that is, prediction value $\hat{y}$ of the controlled variable y) is represented by the following equation.

$$\hat{y}=f(x)$$

f=R^r→R (test prediction model 31)
r: the number or variables included in the manipulated variable x The regression model f (test prediction model 31) is a mapping from an initial set $R^r$ to a final set R. The set R is a set of real numbers, and the value of r indicates the number of variables included in the manipulated variable x.

The test prediction model generation device 3 sends the acquired test prediction model 31 to the test control device 4 (more specifically, the test manipulated variable generation device 41).

Test manipulated variable Generation Device

The test manipulated variable generation device 41 estimates the manipulated variable x by using a variable importance level (v) and random sampling.

The value of the variable importance level v indicates the degree (the degree of contribution) that the manipulated variable x (explanatory variable) contributes to the prediction of the controlled variable y (objective variable). More specifically, the variable importance level v includes one or more importance levels corresponding to each of the one or more variables included in the manipulated variable x. The importance levels indicate the degree to which the variable of the corresponding manipulated variable x contributes to the prediction of the controlled variable y. Each of the importance levels is a value of 0 or more, for example. Alternatively, each of the importance levels may be either a positive value or a negative value. Here, it is assumed that the greater the importance level, the more the variable of the corresponding manipulated variable x contributes to the prediction of the controlled variable y.

For example, the manipulated variable x shown in FIG. 3 includes three types of commands (that is, three variables): a read command, a write command, and a reset command. In this case, the variable importance level v includes three importance levels, one corresponding to each of the three types of commands.

The test manipulated variable generation device 41 calculates the variable importance level v by using the test prediction model 31. Specifically, when the test prediction model 31 is a linear regression model, the test manipulated variable generation device 41 calculates the variable importance level v based on the coefficient matrix w. When the test prediction model 31 is a decision tree model, the test manipulated variable generation device 41 calculates the variable importance level v based on the number of times each of the variables included in the manipulated variable x appears in a node, for example.

Reference Document 2 below also proposes a variable importance level v that does not depend on the type of model used as the test prediction model 31.

Reference Document 2: Brandon Greenwell, Brad Boehmke, Bernie Gray, "vip: Variable Importance Plots", [online], [Searched on Aug. 17, 2021], Internet <URL: https://koalaverse.github.io/vip/index.html>

The test manipulated variable generation device 41 generates the manipulated variable x by using the test prediction model 31 and the calculated variable importance level v.

Figure 7:
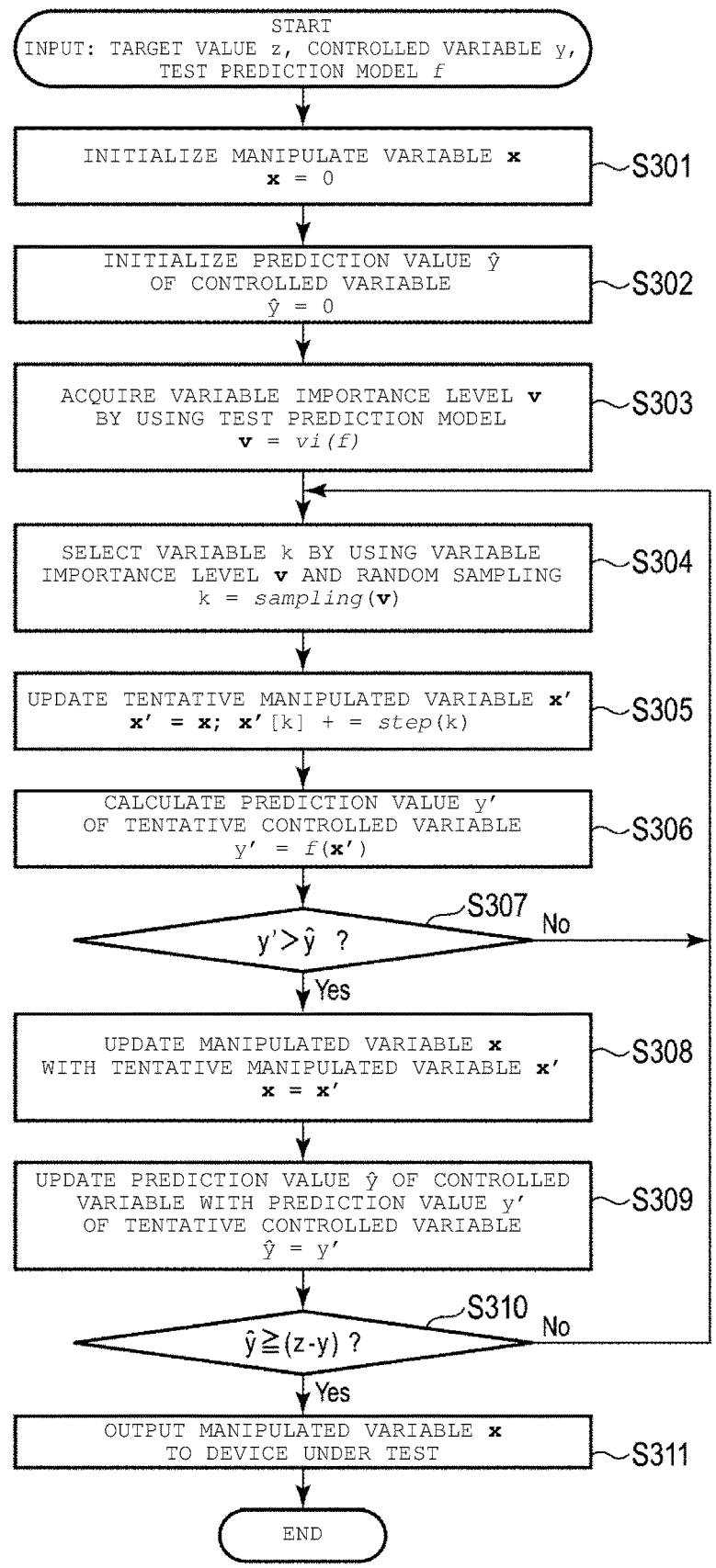
FIG. 7 is a flowchart of test manipulated variable generation processing executed in a test manipulated variable generation device provided in a test control device in a test system according to a second embodiment.

FIG. 7 is a flowchart showing an example of a procedure of test manipulated variable generation processing executed by the test manipulated variable generation device 41 provided in the test control device 4 in the test system 1 according to the second embodiment. The test manipulated variable generation processing is processing for generating the manipulated variable x. The target value z, the controlled variable y, and the test prediction model (f) are input to the test manipulated variable generation device 41. The controlled variable y is an initial value or a controlled variable obtained from a previous processing result of the DUT 53. In FIG. 7, the test prediction model 31 is referred to as a "test prediction model f." After the test control device 4 is requested to execute the test, the test manipulated variable generation device 41 executes the test manipulated variable generation processing while the controlled variable y is less than the target value z.

First, the test manipulated variable generation device 41 initializes the manipulated variable x (S301). That is, the test manipulated variable generation device 41 sets the manipulated variable x to zero. The test manipulated variable generation device 41 also initializes a prediction value ˆy of the controlled variable (S302). That is, the test manipulated variable generation device 41 sets the prediction value ˆy of the controlled variable to 0.

Next, the test manipulated variable generation device 41 acquires the variable importance level v corresponding to the manipulated variable x by using the test prediction model f (S303). A function vi (f) for deriving a variable importance level (v) by using the test prediction model f is used.

The test manipulated variable generation device 41 selects a variable k by using the variable importance level v and random sampling (S304). More specifically, the test manipulated variable generation device 41 samples the variable k based on the categorical distribution weighted by the variable importance level v. The categorical distribution weighted by the variable importance level v is a probability distribution based on the variable importance level v. The variable k is a value that specifies any one of the variables included in the manipulated variable x. For example, if the variable k is 1, a first variable x[1] is specified among the variables included in the manipulated variable x. When the variable k is sampled based on the categorical distribution weighted by the variable importance level v, the more the variable x[k] of the manipulated variable x is associated with higher importance, the higher the probability that the corresponding variable k will be sampled.

The variable of the manipulated variable x having an importance level of 0 may be excluded as a sampling target. When the target value z is larger than 0, the variable of the manipulated variable x associated with a negative importance level may be excluded as a sampling target.

Next, the test manipulated variable generation device 41 updates the tentative manipulated variable x' by using the sampled variable k (S305). Specifically, the test manipulated variable generation device 41 sets the manipulated variable x as a tentative manipulated variable x' value. Then, a specific value is added to a k-th variable x[k] included in the tentative manipulated variable x'. The specific value is the updated amount of the variable x[k]. The specific value is derived, for example, by using the function step (k) for the variable k. The specific value may be a fixed value (for example, 1) regardless of the value of the variable k.

The test manipulated variable generation device 41 calculates the prediction value y' of the tentative controlled variable corresponding to the updated tentative manipulated variable x' by using the test prediction model f (S306).

Then, the test manipulated variable generation device 41 determines whether or not the calculated prediction value y' of the tentative controlled variable is larger than the prediction value ˆy (S307). That is, the test manipulated variable generation device 41 determines whether or not the prediction value y' of the tentative controlled variable is closer to the target value z than the prediction value ˆy. The prediction value ˆy indicates the maximum value among the prediction values y' of the tentative controlled variable calculated before the prediction value y' of the current tentative controlled variable in the test manipulated variable generation processing during execution.

When the prediction value y' of the tentative controlled variable is equal to or less than the prediction value ˆy (S307 No), the test manipulated variable generation device 41 proceeds to the procedure of S304. By proceeding to the procedure of S304, the test manipulated variable generation device 41 further updates the tentative manipulated variable x' and the prediction value y' of the tentative controlled variable. As a result, the test manipulated variable generation device 41 can generate the manipulated variable x in which the controlled variable y closer to the target value z may be obtained.

When the prediction value y' of the tentative controlled variable is larger than the prediction value ˆy of the controlled variable (S307 Yes), the test manipulated variable generation device 41 updates the manipulated variable x with the tentative manipulated variable x' (S308). That is, the test manipulated variable generation device 41 sets the tentative manipulated variable x' as the manipulated variable x. The test manipulated variable generation device 41 also updates the prediction value ˆy of the controlled variable with the prediction value y' of the tentative controlled variable (S309). That is, the test manipulated variable generation device 41 sets the prediction value y' of the tentative controlled variable to be the prediction value ^y of the controlled variable. Then, the test manipulated variable generation device 41 determines whether or not the prediction value ^y is equal to or greater than the difference obtained by subtracting the controlled variable y from the target value z (S310). The prediction value ^y of the controlled variable being equal to or greater than the difference obtained by subtracting the controlled variable y from the target value z is a condition (end condition) for ending the test manipulated variable generation processing. At least one of the procedures from S304 to S307 or the number of repetitions of the procedure from S304 to S309 exceeding the maximum value, the manipulated variable x exceeding the maximum value, and the cumulative value of the number of commands executed by the DUT 53 exceeding a threshold value may be added to the end condition.

When the prediction value ^y is less than the difference obtained by subtracting the controlled variable y from the target value z (S310 No), (that is, when the end condition is not satisfied) the test manipulated variable generation device 41 proceeds to the procedure of S304.

When the prediction value ^y is equal to or greater than the difference obtained by subtracting the controlled variable y from the target value z (S310 Yes), that is, when the end condition is satisfied, the test manipulated variable generation device 41 outputs the manipulated variable x to the test processing device 42 (S311), and ends the test manipulated variable generation processing (end).

By the test manipulated variable generation processing shown in FIG. 7, the test manipulated variable generation device 41 may generate the manipulated variable x. Specifically, the test manipulated variable generation device 41 acquires the variable importance level v based on the test prediction model 31. The test manipulated variable generation device 41 selects the variable x[k] included in the manipulated variable x by using the variable importance level v and random sampling. The test manipulated variable generation device 41 generates the tentative manipulated variable x' by adding a specific value to the variable x[k]. The test manipulated variable generation device 41 calculates the prediction value y' of the tentative controlled variable by using the tentative manipulated variable x' and the test prediction model 31. Then, when the prediction value y' of the tentative controlled variable is larger than the prediction value ^y and is equal to or greater than the difference obtained by subtracting the controlled variable y from the target value z, the test manipulated variable generation device 41 outputs the tentative manipulated variable x' as the manipulated variable x.

In this way, the test manipulated variable generation device 41 generates the manipulated variable x by using the variable importance level v and random sampling. Therefore, in the test system 1, various regression models that are not limited to the linear regression model (that is, the regression model that may obtain the inverse matrix w⁻) can be used as the test prediction model 31. In other examples, a "black box" test prediction model 31 can also be used.

In the test system 1 of the second embodiment, an advanced regression model with improved prediction accuracy can be used as the test prediction model 31. By using a test prediction model 31 with high prediction accuracy, it is possible to calculate the prediction value y' of the controlled variable with higher accuracy. Further, by acquiring the variable importance level v based on the test prediction model 31 with high prediction accuracy, the time required to generate the manipulated variable x can be shortened. As a result, in the test system 1, the test time can be shortened as compared with the case where the DUT 53 is tested by using, for example, a manipulated variable that is simply a random number.

As described above, according to the first and second embodiments, the test time can be predicted and shortened. The test control device 4 includes a test manipulated variable generation device 41 and a test processing device 42. The test manipulated variable generation device 41 uses the test prediction model 31 that predicts a controlled variable in the DUT 53 that is executed the processing based on the manipulated variable including one or more variables to generate a first manipulated variable based on the difference between the target value and a first controlled variable. The test processing device 42 acquires a second controlled variable in the DUT 53 that is executed the processing based on the first manipulated variable. When the second controlled variable is equal to or greater than the target value, the test manipulated variable generation device 41 notifies the DUT 53 of the end of the test. When the second controlled variable is less than the target value, the test manipulated variable generation device 41 uses the test prediction model 31 to generate a second manipulated variable based on the difference between the target value and the second controlled variable.

By generating the manipulated variable by using the test prediction model 31, the test control device 4 can predict (estimate) the test time. Furthermore, in the test control device 4, the test time can be shortened as compared with the case where a random number is generated as the manipulated variable.

Each of the various functions described in the first and second embodiments may be implemented by hardware circuits (processing circuits). Examples of the processing circuit include a software programmed processor such as a central processing unit (CPU). The processor executes each of the described functions by executing one or more computer programs (instructions) stored in a memory. The processor may be a microprocessor that includes dedicated electrical circuits or the like. Examples of the processing circuit also include digital signal processors (DSPs), application specific integrated circuits (ASICs), microcontrollers, controllers, and other electrical circuit components.

COMPARATIVE EXAMPLE

Figure 8A:
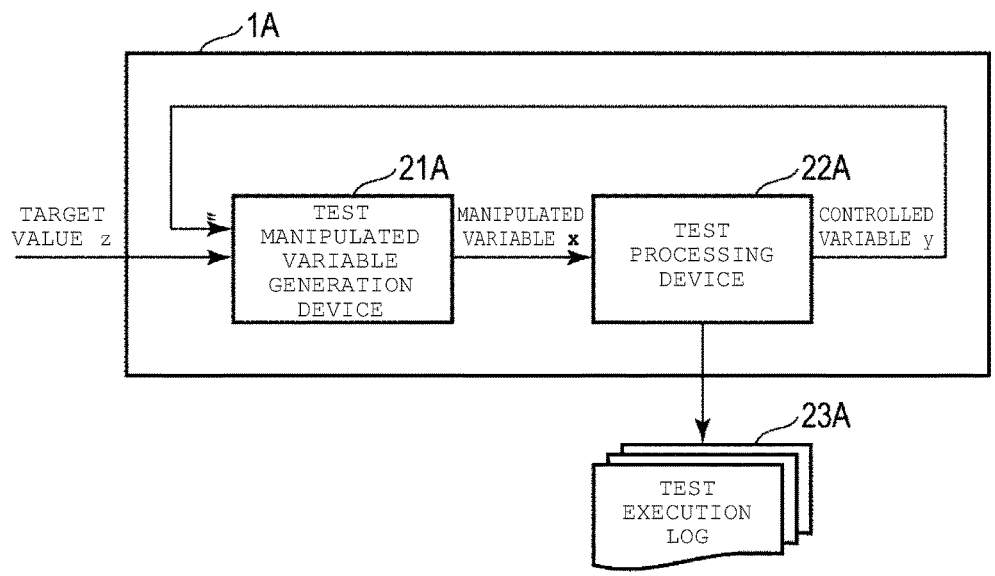
FIG. 8A is a diagram showing an operation in a test system according to a comparative example.

FIG. 8A is a diagram showing the operation of the test system 1A according to a comparative example. The test system 1A is a system that tests a device in order to verify whether the device satisfies device specifications. In the following, the device to be tested in order to verify whether the specifications are satisfied is also referred to as a "device under test" (DUT).

The test system 1A includes a test manipulated variable generation device 21A and a test processing device 22A.

The test manipulated variable generation device 21A is a device that generates the manipulated variable x. The manipulated variable x is an input to the test processing device 22A. The test manipulated variable generation device 21A generates the manipulated variable x by the same method as the test manipulated variable generation device 21 of the first embodiment. That is, the test manipulated variable generation device 21A generates random numbers as the variables constituting the manipulated variable x.

The test processing device 22A is a device that executes a test using the manipulated variable x and outputs the controlled variable y and a test execution log 23A.

The controlled variable y is the value of a variable obtained from the executed test. The controlled variable y indicates the number of commands, time, amount, and the like related to a specific operation in the test.

The test execution log 23A is log data related to the executed test. The test execution log 23A includes, for example, information indicating the content of the test, numerical values calculated during the test, and information based on the test result. The test execution log 23A includes the manipulated variable x and the controlled variable y.

The test system 1A is given the target value z. The target value z is a condition for the test system 1A to end the test. The target value z is determined, for example, based on the specifications of the device being tested (the DUT).

In the test system 1A, the test is repeated until the controlled variable y reaches the target value z.

Figure 8B:
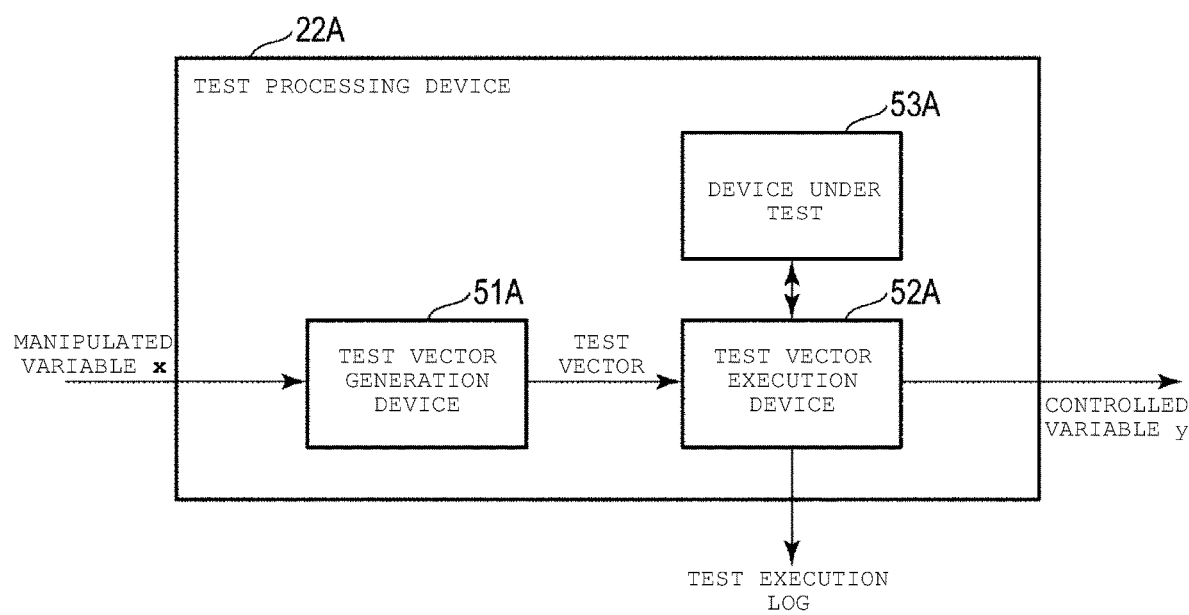
FIG. 8B is a diagram showing an operation in a test processing device in a test system according to a comparative example.

FIG. 8B is a diagram showing the operation of the test processing device 22A in the test system 1A according to the comparative example.

The test processing device 22A includes a test vector generation device 51A, a test vector execution device 52A, and a device under test (DUT) 53A.

The test vector generation device 51A is a device that generates a test vector based on the manipulated variable x. The test vector is data input to the DUT 53A. The test vector includes, for example, commands and parameters.

The test vector execution device 52A is a device that causes the DUT 53A to execute processing based on the test vector.

The DUT 53A is some device being tested to determine whether or not device specifications are satisfied.

Next, the operations of the test vector generation device 51A, the test vector execution device 52A, and the DUT 53A will be described.

First, the test vector generation device 51A converts the manipulated variable x into a test vector used for executing the processing by the DUT 53A. The test vector generation device 51A sends the generated test vector to the test vector execution device 52A.

The test vector execution device 52A sends commands and parameters included in the test vector to the DUT 53A in a form and at a timing at which the DUT 53A may execute the processing.

The DUT 53A executes processing based on the sent command and parameters.

The test vector execution device 52A sends the controlled variable y to the test manipulated variable generation device 21A based on the processing executed by the DUT 53A. The test vector execution device 52A also generates the test execution log 23A based on the processing executed by the DUT 53A.

By the above operation, in the test processing device 22A, the processing based on the manipulated variable x can be executed by the DUT 53A. Then, the test processing device 22A can output the controlled variable y and the test execution log 23A based on the processing executed by the DUT 53A.

In the test system 1A according to the comparative example, a random number is generated for each variable constituting the manipulated variable x. Therefore, since the DUT 53A executes the processing based on a random number, the time (testing time) until the controlled variable y (obtained as the processing result) becomes the target value z or more can not be predicted. Furthermore, in the test system 1A, the testing time may be long.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A test control device, comprising:
a test manipulated variable generation device configured to predict a value for a controlled variable for a device under test based on a test prediction model to generate a first manipulated variable that is based on a difference between a target value and a first controlled variable value from the device under test, the device under test executing processing based on a command associated with a manipulated variable including one or more individual variables and generating controlled variable values based on the manipulated variable; and
a test processing device configured to acquire a second controlled variable value from the device under test based on the generated first manipulated variable, wherein
the test manipulated variable generation device is further configured to:
notify the device under test of an end of a test if the second controlled variable value is equal to or greater than the target value, and
use the test prediction model to generate a second manipulated variable based on a difference between the target value and the second controlled variable value if the second controlled variable value is less than the target value.

2. The test control device according to claim 1, wherein
the test processing device is further configured to acquire a third controlled variable value from the device under test based on the second manipulated variable, and
the test manipulated variable generation device is further configured to notify the device under test of the end of the test if the third controlled variable value is equal to or greater than the target value.

3. The test control device according to claim 1, wherein the test manipulated variable generation device is further configured to:
use the test prediction model to calculate importance levels indicating a degree to which each of the one or more individual variables of the manipulated variable contributes to a prediction of the controlled variable value,
use the importance levels to select a first variable from the one or more individual variables included in the first manipulated variable,
add a first value to the first variable, and
use the test prediction model and the first manipulated variable to calculate a first controlled variable prediction value.

4. The test control device according to claim 3, wherein the test processing device is further configured to acquire the second controlled variable value from the device under test based on the first manipulated variable when the first controlled variable prediction value is equal to or greater than the difference between the target value and the first controlled variable value.

5. The test control device according to claim 4, wherein the test manipulated variable generation device is further configured to notify the device under test of the end of the test when the second controlled variable value is equal to or greater than the target value.

6. The test control device according to claim 5, wherein the test manipulated variable generation device is further configured to:
   select a second variable from the one or more individual variables included in the first manipulated variable when the first controlled variable prediction value is less than the difference between the target value and the first controlled variable value,
   add a second value to the second variable, and
   use the test prediction model and the first manipulated variable to calculate a second controlled variable prediction value.

7. The test control device according to claim 6, wherein the test processing device is further configured to:
   acquire the second controlled variable value from the device under test based on the first manipulated variable when the second controlled variable prediction value is equal to or greater than the difference between the target value and the first controlled variable value.

8. The test control device according to claim 7, wherein the test manipulated variable generation device is further configured to:
   use the one or more importance levels to select a third variable from one or more individual variables included in the second manipulated variable when the second controlled variable value is less than the target value,
   add a third value to the third variable, and
   use the test prediction model and the second manipulated variable to calculate a third controlled variable prediction value; and
   the test processing device is further configured to:
   acquire a third controlled variable value from the device under test based on the second manipulated variable when the third controlled variable prediction value is equal to or greater than the difference between the target value and the second controlled variable value.

9. The test control device according to claim 8, wherein the test manipulated variable generation device is further configured to notify the device under test of the end of the test when the third controlled variable value is equal to or higher than the target value.

10. The test control device according to claim 1, wherein the test prediction model is repeatedly used to generate manipulated variables based on a difference between the target value and a controlled variable value until the controlled variable value acquired from the device under test becomes equal to or greater than the target value.

11. The test control device according to claim 10, wherein the test prediction model is a regression model.

12. The test control device according to claim 1, wherein the test prediction model is a regression model.

13. The test control device according to claim 1, wherein the test prediction model is a linear regression model.

14. The test control device according to claim 1, wherein the test manipulated variable generation device is further configured to:
   calculate an inverse matrix of a coefficient matrix representing the test prediction model, and
   use the inverse matrix to generate the first manipulated variable and the second manipulated variable.

15. The test control device according to claim 1, wherein the test prediction model is a non-linear regression model.

16. The test control device according to claim 1, wherein the test prediction model is generated by using log data obtained by executing a test on the device under test.

17. A test system, comprising:
   a test prediction model generation device; and
   a test control device, wherein
   the test prediction model generation device uses log data obtained by executing a test on a device under test to generate a test prediction model for predicting a controlled variable value from the device under test executing processing based on a command associated with a manipulated variable,
   the test control device includes:
      a test manipulated variable generation device configured to predict a value for a controlled variable for a device under test based on the test prediction model to generate a first manipulated variable that is based on a difference between a target value and a first controlled variable value from the device under test, and
      a test processing device configured to acquire a second controlled variable value from the device under test based on the generated first manipulated variable; and
   the test manipulated variable generation device is further configured to:
      notify the device under test of an end of a test if the second controlled variable value is equal to or greater than the target value, and
      use the test prediction model to generate a second manipulated variable based on a difference between the target value and the second controlled variable value if the second controlled variable value is less than the target value.

18. A control method, comprising:
   using a test prediction model that predicts a controlled variable value from a device under test that is executing processing based on a command associated with a manipulated variable including one or more individual variables to generate a first manipulated variable based on a difference between a target value and a first controlled variable value;
   acquiring a second controlled variable value from the device under test, wherein the device under test is executing processing based on the command associated with the first manipulated variable;
   notifying the device under test of end of a test when the second controlled variable value is equal to or greater than the target value; and
   using the test prediction model to generate a second manipulated variable based on a difference between the target value and the second controlled variable value when the second controlled variable is less than the target value.

19. The control method according to claim 18, wherein the test prediction model is repeatedly used to generate manipulated variables based on a difference between the target value and a controlled variable value until the controlled variable value acquired from the device under test becomes equal to or greater than the target value.

20. The control method according to claim 18, wherein the device under test is one of a solid-state storage device or a universal flash storage device.

* * * * *